Figures 1, 2:
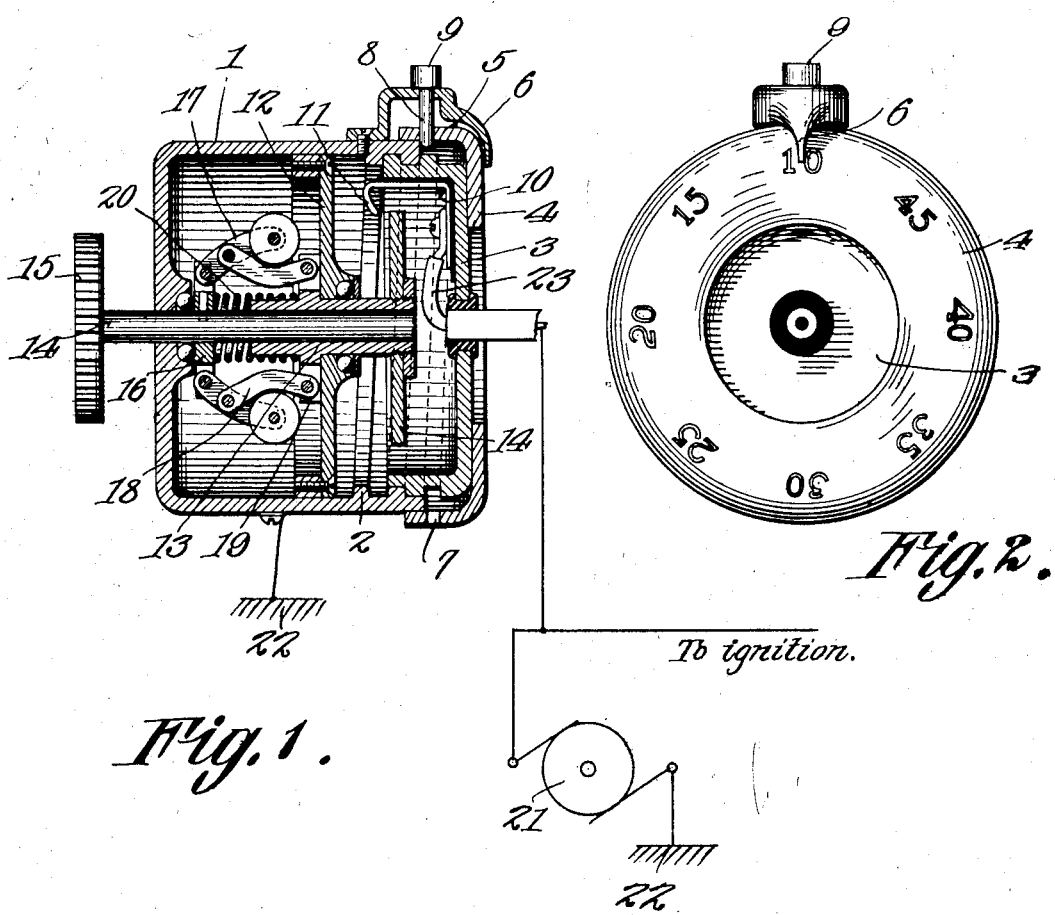

F. S. HOWELL.
SPEED CHECK.
APPLICATION FILED FEB. 25, 1914.

1,110,784. Patented Sept. 15, 1914.

Frank S. Howell
Inventor,
by C. A. Snow & Co.
Attorneys.

Witnesses

UNITED STATES PATENT OFFICE.

FRANK S. HOWELL, OF NEW ROCHELLE, NEW YORK.

SPEED-CHECK.

1,110,784. Specification of Letters Patent. Patented Sept. 15, 1914.

Application filed February 25, 1914. Serial No. 821,105.

*To all whom it may concern:*

Be it known that I, FRANK S. HOWELL, a citizen of the United States, residing at New Rochelle, in the county of Westchester and State of New York, have invented a new and useful Speed-Check, of which the following is a specification.

This invention relates to speed checks, its object being to automatically limit the speed of a vehicle or other structure propelled by a hydro-carbon motor or an electric motor.

Another object is to provide means whereby any predetermined speed can be used as a limit so that, when said speed is reached, the motor will be rendered inactive.

A further object is to provide a speed check which is simple and compact in construction, can be applied readily to either the running gear or to the body of a motor vehicle, and which will not easily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a central longitudinal section through the speed check, the wiring being shown in diagram. Fig. 2 is an end elevation of the device and showing the indicating dial.

Referring to the figures by characters of reference 1 designates the casing of the structure constituting the present invention. This casing is preferably cylindrical with one end closed, while the other end of the casing is provided with coarse interior screw threads 2 adapted to be engaged by the threaded exterior of a screw cap 3. A ring 4 may be formed with or secured to the cap 3 in any suitable manner, this ring being preferably concentric with the cap and having a flange 5 extending around and spaced from the side of the cap so that the wall of the casing 1 is thus free to enter between the cap and the flange 5. A pointer or index 6 may be secured to the casing so as to extend partly over the ring 4, this pointer being used in connection with a series of numerals or the like designating the various speed limits to which the check may be adjusted. The flange 5 may be provided with an annular series of apertures 7 any one of which is adapted to receive the tumbler 8 of a lock 9. This lock can be of any preferred construction and it has not been deemed necessary to enter into a detailed description thereof or to illustrate it in detail. The lock is utilized for the purpose of fastening the screw cap 3 against rotation after it has been adjusted to bring any one of the numerals to position back of the pointer or index 6.

A strip 10 of conductive material is secured to but insulated from the interior of the cap 3 and one end portion of this strip is bent inwardly to form a yielding contact 11.

Secured within the casing 1 is a disk 12 in which is journaled a sleeve 13 to one end of which is secured a disk 14' projecting between the contact 11 and the cap 3. A shaft 14 extends through the sleeve and is journaled in one end of the casing 1, this shaft being provided with a gear 15 adapted to be actuated in any suitable manner. Shaft 14 has a collar 16 to which are pivoted the weighted arms 17 of a centrifugal governor, these weighted arms being connected, by links 18, to a flange 19 extending from the sleeve 13. A spring 20 is mounted on sleeve 13 and bears at one end against the flange 19 and at its other end against the collar 16, this spring thus operating to hold the flange 19 normally pressed against the partition 12 and the disk 14 normally pressed away from the contact 11.

As shown in Fig. 2, the casing 1 as well as the generator 21 is grounded to the frame 22 of the motor vehicle and a lead 23 connects the strip 10 to the ignition system.

It will be apparent that the rotation of the gear 15 will result in the rotation of shaft 14 and the weighted arms 17 will thus be thrown outwardly by centrifugal force, this movement being resisted by the spring 20. When the speed of rotation of the gear reaches a predetermined degree, the disk 12 will be shifted by the sleeve 13 and the centrifugal governor, so as to come against the contact 11. This will immediately result in short circuiting the ignition system so that the vehicle cannot attain any greater speed through energy imparted by the engine. When, however, the speed of the vehicle diminishes, the governor is shifted toward its normal position by spring 20 and disk 12 will be moved away from the contact 11, thus again placing the ignition system in circuit and permitting the engine to drive the vehicle as before.

It is to be understood that if the vehicle is equipped with a battery timing system, it would be necessary to employ four contacts 11 instead of the one shown.

Obviously by mounting the contact 11 upon the adjustable cap 3, said contact can be shifted toward or from the partition 12 simply by rotating the cap. As before stated, numerals can be arranged on the cap for the purpose of indicting speed limits. The parts are so proportioned that when any one of the numerals is brought to position back of the index or pointer 6, the said numeral will indicate the limit of speed at which the vehicle may be driven.

While the device herein described is especially designed for use in connection with motor vehicles, it is to be understood that it can be used for checking the speed of any element such as a drive shaft or the like propelled by a hydro-carbon motor. It can also be utilized efficiently as a means for checking the speed of an electric vehicle by short circuiting the motor.

What is claimed is—

1. In a speed check, a centrifugally controlled switch including a casing, a revoluble disk, a governor for shifting the disk along its axis of rotation, a contact in the path of the disk, and a cap closing one end of the casing, said cap being movable to adjust the contact to vary the gap between the contact and disk.

2. In a speed check, a centrifugally controlled switch including a casing, a revoluble disk, a governor for shifting the disk along its axis of rotation, a contact in the path of the disk, a cap closing one end of the casing, said cap being movable to adjust the contact to vary the gap between the contact and disk, and means upon the casing and cap for indicating the extent of adjustment of the contact.

3. In a speed check a centrifugally controlled switch including a casing, a disk mounted for rotation therein, a centrifugal governor for shifting the disk along its axis of rotation, means for rotating the disk and governor, a revoluble cap adjustably engaging the casing, and a contact carried thereby and projecting into the path of the disk, said cap being revoluble to vary the gap between the contact and disk.

4. In a speed check a centrifugally controlled switch including a casing, a disk mounted for rotation therein, a centrifugal governor for shifting the disk along its axis of rotation, means for rotating the disk and governor, a revoluble cap adjustably engaging the casing, a contact carried thereby and projecting into the path of the disk, said cap being revoluble to vary the gap between the contact and disk, and coöperating means upon the cap and casing for indicating the speed at which the device is set.

5. In a speed check a centrifugally controlled switch including a casing, a disk mounted for rotation therein, a centrifugal governor for shifting the disk along its axis of rotation, means for rotating the disk and governor, a revoluble cap adjustably engaging the casing, a contact carried thereby and projecting into the path of the disk, said cap being revoluble to vary the gap between the contact and disk, and coöperating means upon the cap and casing for locking said cap against rotation.

In testimony that I claim the foregoing as my own, I have hereto affixed my signature in the presence of two witnesses.

FRANK S. HOWELL.

Witnesses:
JOHN S. VALLELY,
WALDO E. PALMER.